(12) United States Patent
Terashima et al.

(10) Patent No.: US 8,832,313 B2
(45) Date of Patent: Sep. 9, 2014

(54) TERMINAL DEVICE

(75) Inventors: Yoshiki Terashima, Kanagawa-ken (JP); Kotaro Ise, Saitama-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 84 days.

(21) Appl. No.: 13/015,963

(22) Filed: Jan. 28, 2011

(65) Prior Publication Data

US 2011/0238865 A1      Sep. 29, 2011

(30) Foreign Application Priority Data

Mar. 25, 2010  (JP) .................................. 2010-070210

(51) Int. Cl.
*G06F 15/16*      (2006.01)
*H04L 12/28*      (2006.01)

(52) U.S. Cl.
CPC ................................ *H04L 12/2805* (2013.01)
USPC ......................................... 709/245; 709/223

(58) Field of Classification Search
CPC .................................................. H04L 12/2805
USPC .............................................................. 709/245
See application file for complete search history.

(56) References Cited

U.S. PATENT DOCUMENTS

| | | | |
|---|---|---|---|
| 6,493,750 B1 * | 12/2002 | Mathew et al. ................ | 709/220 |
| 6,895,284 B2 * | 5/2005 | Morita ............................ | 700/19 |
| 7,254,606 B2 * | 8/2007 | Hamada ......................... | 709/203 |
| 2007/0288623 A1 * | 12/2007 | Kato et al. ..................... | 709/223 |
| 2008/0189775 A1 * | 8/2008 | Fujita ................................. | 726/7 |
| 2009/0072991 A1 * | 3/2009 | Hayashi et al. ................ | 340/825 |
| 2009/0116502 A1 * | 5/2009 | Hall et al. ...................... | 370/406 |

FOREIGN PATENT DOCUMENTS

| | | | | |
|---|---|---|---|---|
| EP | 2009/056579 | * | 5/2009 | ............. H04L 29/08 |
| JP | 2005-78220 | | 3/2005 | |

* cited by examiner

*Primary Examiner* — Jason K. Gee
*Assistant Examiner* — Maung Lwin
(74) *Attorney, Agent, or Firm* — Finnegan, Henderson, Farabow, Garrett & Dunner, L.L.P.

(57) ABSTRACT

According to one embodiment, a terminal device is provided, comprising: a first communication unit communicating with a network device by receiving a destination address of a server and identification information for identifying the network device, and receiving transmission data of the network device to the server and the identification information; a device information storage unit that stores the destination address in association with the identification information; a second communication unit communicating with the server, by transmitting the transmission data received from the network device to the server using the destination address that corresponds to the identification information in the device information storage, and receiving from the server a result of determining whether the transmission data transmitted from the second communication unit matches the transmission data that the network device transmits to the server; and a display unit that displays the result of the determination.

7 Claims, 4 Drawing Sheets

TERMINAL DEVICE

CROSS-REFERENCE TO RELATED APPLICATION

This application is based upon and claims the benefit of priority from the prior Japanese Patent Application No. 2010-070210 filed on Mar. 25, 2010, the entire contents of which are incorporated herein by reference.

FIELD

Embodiments described herein relate generally to a terminal device.

BACKGROUND

In recent years, audio-visual devices, home appliances and other devices that can be connected to networks have been under development. The following are standardized as protocols to control such network devices: UPnP (Universal Plug and Play), ECHONET (Registered Trademark), and the like. Digital television sets and other devices that support networks also have made a debut, and the use of home networks has also become widespread.

For such network home appliances, as in the case of personal computers (PC), the settings need to be made in order to connect to a network and operate. Even if the settings have been completed, what is required is a means for examining whether the settings have been made correctly as well as whether the appliances are working appropriately. However, in many cases, for typical network home appliances, user interfaces (UIF) such as an input means for inputting setting information and an output means for outputting operational results are not satisfactory in quality when compared with PCs and the like.

There is a method of associating device identification information of network home appliances with user identification information. According to the method, the user identification information is stored in advance in a server; a network home appliance transmits to the server pieces of home-appliance identification information and user identification information when being connected to a network. The server compares the pieces of user identification information. When the piece of user identification information is valid, the server associates the piece of home-appliance identification information with the piece of user identification information. Therefore, a user of a network home appliance is correctly identified by the server.

However, the problem is that when a network home appliance does not have a UIF such as an output device or the like, it is impossible for a user to confirm whether the network home appliance is being connected to an external server as well as what kind of information is being transmitted about the network home appliance.

DETAILED DESCRIPTION

According to one embodiment, the following are provided: a terminal device comprising: a first communication unit communicating with a network device connected to a network, that receives a destination address of a server accompanied with an identification information for identifying the network device, and receives transmission data of the network device to the server, the transmission data containing internal data of the network device accompanied with the identification information; a device information storage unit that stores the destination address received being associated with the identification information accompanied with the destination address; a second communication unit communicating with the server, that transmits the transmission data received from the network device to the server using such destination address that is corresponding to the identification information accompanied with the transmission data from the device information storage, and receives from the server the result of determining whether the transmission data transmitted from the second communication unit matches the transmission data that the network device transmits to the server; and a display unit that displays the result of the determination.

Hereinafter, an embodiment of the present invention will be described with reference to the accompanying drawings. Incidentally, in each diagram, the same portions are indicated by the same reference symbols and not described repeatedly.

Figure 1:
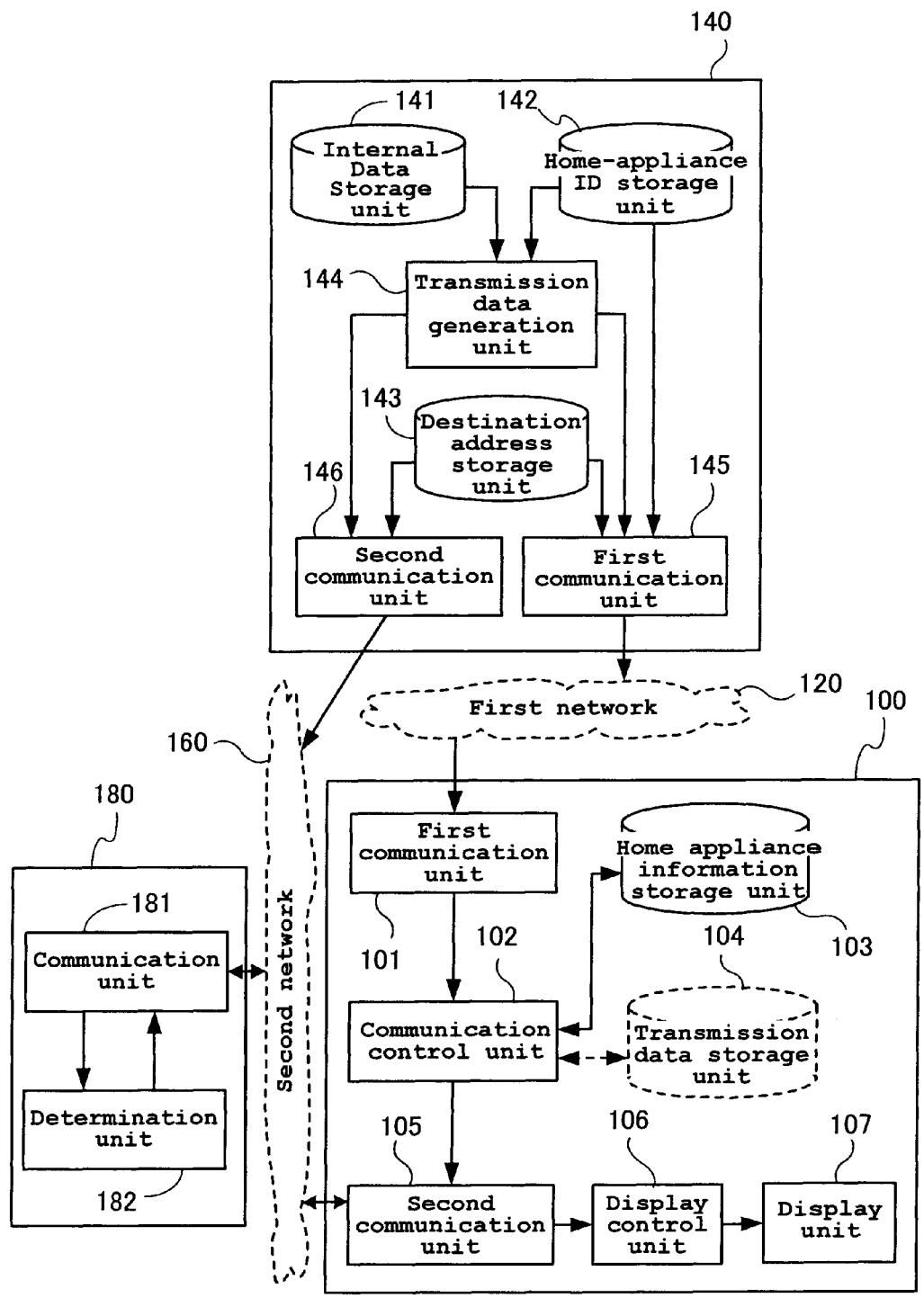
FIG. 1 is a block diagram showing the configuration of a network system according to an embodiment of the present invention.

FIG. 1 is a block diagram showing the configuration of a network system according to the present embodiment. As shown in FIG. 1, the network system of the present embodiment includes a terminal device 100; a network home appliance (network device) 140, which is connected to the terminal device 100 through a network 120; and a server 180, which is connected to the terminal device 100 and the network home appliance 140 through a network 160.

In an example of the basic application of the network system shown in FIG. 1, the network home appliance 140 continuously transmits internal information to the server 180 where the operating condition and the like of the network home appliance are recognized.

The network home appliance 140 is for example a home appliance that does not have a highly functional UIF such as an output device, including a refrigerator and a washing machine.

A basic function that the network home appliance 140 is equipped with is a function of transmitting to the server 180 information that the network home appliance 140 holds.

The network home appliance 140 for example holds identification information for identifying the device, such as a production number, model name or manufacturer name. The identification information of a device is a value that enables a home appliance to be uniquely identified and is referred to as "home-appliance ID" according to the present embodiment. Suppose that the fixed value is set when a home appliance is manufactured, except for the case where the firmware of the home appliance is rewritten. For example, the home-appliance IDs include a unique value that is generated by combining a production number, model name and manufacturer name, or a JAN (Japanese Article Number) code value.

Moreover, the network home appliance 140 retains "internal data," which includes user's operation history information, operating history information, failure occurrence information and the contents thereof. For example, the internal data is information that the network home appliance 140 generates from the results of the internal operation of the network home appliance 140 and is a variable. The internal data may be information that the network home appliance 140 usually generates from the results of the internal operation of the network home appliance 140, or data that is generated again to be used exclusively for checking an information transmission operation upon receiving a request for acquiring the home-appliance ID from the terminal device 100 or upon doing other processes. Incidentally, the internal data may be initial setting information that the network home appliance 140 uses to connect to a network, setting information that the network home appliance 140 uses to get a service from the server 180, or the like.

As shown in FIG. 1, for example, the network home appliance 140 includes an internal data storage unit 141, a home-appliance ID storage unit 142, a destination address storage unit 143, a transmission data generation unit 144, a first communication unit 145, and a second communication unit 146.

The internal data storage unit 141 stores internal data. The home-appliance ID storage unit 142 stores a home-appliance ID.

The transmission data generation unit 144 generates transmission data containing the home-appliance ID and the internal data at a given timing.

The destination address storage unit 143 stores the destination address of a server to which the transmission data is transmitted.

The second communication unit 146 transmits the transmission data to a server indicated by the destination address that is stored in the destination address storage unit 143.

The first communication unit 145 includes a function of transmitting the home-appliance ID, the destination address and the transmission data in response to a request from the terminal device 100.

Information of the home-appliance ID and internal data of the network home appliance 140 having the above configuration is analyzed after being received. As a result, what is obtained is information that is instrumental in maintaining and managing the home appliance, including information as to what kind of home appliances exists in which household, whether the home appliance is malfunctioning, or which function of the home appliance is frequently used. Accordingly, it is necessary for the information of home-appliance ID and internal data to be transmitted to an appropriate server (described later).

(Terminal Device)

As shown in FIG. 1, the terminal device 100 includes a first communication unit 101, a communication control unit 102, a home appliance information storage unit 103, a transmission data storage unit 104, a second communication unit 105, a display control unit 106, and a display unit 107.

The first communication unit 101 communicates with the network home appliance 140 through the first network 120. The communication control unit 102 controls the communication of the first communication unit 101 and acquires the home-appliance ID and destination address that the network home appliance 140 holds, as well as the transmission data generated by the network home appliance 140.

The communication control unit 102 stores in the home appliance information storage unit 103 the home appliance information (device information) where the acquired home-appliance ID is associated with the destination address. The communication control unit 102 transmits the acquired transmission data to the destination address of the home appliance information corresponding to the home-appliance ID included in the acquired transmission data. Incidentally, the communication control unit 102 may store the acquired transmission data in the transmission data storage unit 104.

The second communication unit 105 transmits, through the network 160, the transmission data to the server 180 that is indicated by the destination address of the home appliance information corresponding to the home-appliance ID that the transmission data includes.

The display control unit 106 displays the transmission data that is to be transmitted to the server 108 and the destination address on the display unit 107. The display control unit 106 can be realized by, for example, a display function of a Web browser.

A method of examining whether the destination address is reliable with the use of a Web browser will be described later.

The server 180 includes a communication unit 181 and a determination unit 182. The communication unit 181 receives the transmission data transmitted from the network home appliance 140 and the terminal device 100. The determination unit 182 compares the transmission data (which includes the home-appliance ID and the internal data) transmitted from the network home appliance 140 with the transmission data (which includes the home-appliance ID and the internal data) transmitted from the terminal device 100 and makes a determination as to whether the transmission data transmitted from the network home appliance 140 matches the transmission data transmitted from the terminal device 100. The communication unit 181 transmits the result of the determination to the terminal device 100 through the second network. The result of the determination transmitted from the server 180 is received by the second communication unit 105 of the terminal device 100. The display control unit 106 displays the result of the determination on the display unit 107. Therefore, it is possible for a user to visually confirm the to-be-connected server and the contents of the transmission information.

(Network)

For a network protocol of the first network 120, for example, UPnP or ECHONET (Registered Trademark) can be used. UPnP is a kind of PnP (Plug and Play) that is expanded to a network level: PnP is a system in which a device is automatically detected and appropriately set when an peripheral device, expansion board or the like is connected to a personal computer. ECHONET (Registered Trademark) is a network that makes use of a domestic electric lamp line or wireless communication. When UPnP is used, the network home appliance 140 that is connected to the terminal device 100 through the network is detected with the use of a device search function of UPnP; the information of home-appliance ID, destination address and internal data can be acquired with the use of a device control function of UPnP.

The terminal device 100 is physically connected to the network home appliance 140 thanks to wired connection means, such as Ethernet (Registered Trademark), USB or IEE1394, 802.11a/b/g, Bluetooth (Registered Trademark), or the like.

For a network protocol of the second network 160, for example, HTTP (Hypertext Transfer Protocol) or HTTPS (Hypertext Transfer Protocol Security) can be used. In this case, the server 180 can be realized as a Web server on the Internet. The Web server is a computer on which software having a function of transmitting and receiving information is installed in a WWW system.

A method of examining the destination address will be described with the use of a Web browser function that is applied in the present embodiment. A typical Web browser is equipped with a function of presenting to a user the fact that a Web server that the user is going to communicate with in a predetermined manner is a valid server for the user. For example, a URL, which is used to identify the location of the Web server, is continuously displayed on the Web browser. Furthermore, if the Web server with which the user is going to communicate has been authenticated by a third-party organization, what is displayed is the fact that the Web server has been authenticated. Conversely, if the location of the Web server has not been authenticated, a warning or the like is displayed for the user.

The above-described method of examining the destination address can be realized by the use of the authentication function of the Web browser that displays the results of the examination. The Web browser transmits information in accordance with what is described in a HTML file. Therefore, the user can check how the communication takes place by examining the contents of the HTML file.

Figure 2:
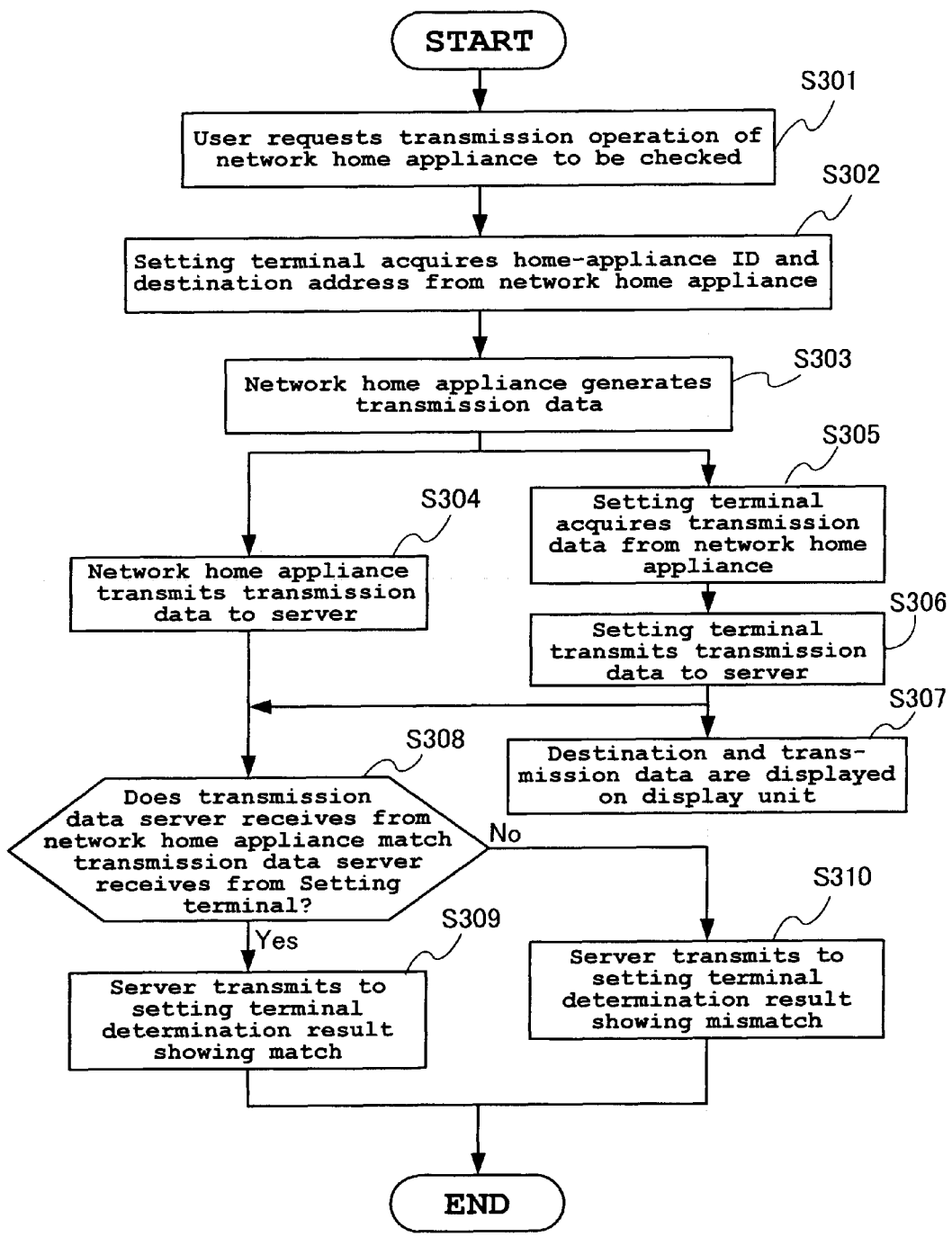
FIG. 2 is a flowchart illustrating the operation of a network system according to the present embodiment.

The following describes the operation of the network system having the above configuration. FIG. 2 is a flowchart illustrating the operation of the network system according to the present embodiment.

When a user requests that an operation of the network home appliance 140 transmitting information to the server 180 be checked (S301), the communication control unit 102 of the terminal device 100 acquires the home-appliance ID and destination address that the network home appliance 140 has from the network home appliance 140 through the first communication unit 101 (S302). For example, the settings as to from which network home appliance the terminal device 100 acquires the home-appliance ID are selected by the user from a list of network home appliances that is displayed on the terminal device 100. Or alternatively, the following is also possible: The network home appliance whose transmission operation is to be checked transmits a specific signal, which the terminal device 100 detects to select a network home appliance. The process of acquiring the home-appliance ID may be performed each time a request for checking the transmission operation is made. Or alternatively, the process of acquiring the home-appliance ID may be performed in advance for all network home appliances 140 that the terminal device 100 can communicate with.

The communication control unit 102 stores in the home appliance information storage unit 103 the home appliance information where the acquired home-appliance ID is associated with the destination address.

Then, the network home appliance 140 generates the internal data that is to be transmitted to the server. The generated internal data may be stored in the internal data storage unit 141.

The transmission data generation unit 144 generates the transmission data containing the home-appliance ID, which is to be stored in the home-appliance ID storage unit 142, and the generated internal data (S303). The second communication unit 146 transmits the generated transmission data to the destination address that is stored in the destination address storage unit 143 (S304).

Meanwhile, the communication control unit 102 of the terminal device 100 acquires, through the first communication unit 101, the transmission data the network home appliance 140 has generated (S305). The communication control unit 102 transmits the acquired transmission data to the destination address of the home appliance information corresponding to the home-appliance ID that is included in the acquired transmission data (S306). Incidentally, the communication control unit 102 may store the acquired transmission data in the transmission data storage unit 104. At this time, the destination is indicated by the destination address that is acquired at step S302 along with the home-appliance ID.

The terminal device 100 uses the display control unit 106 to display on the display unit 107 the transmission data (the home-appliance ID and the internal data) and the server with which the second communication unit 105 is actually communicating (S307). Moreover, the terminal device 100 may display on the display unit 107 the message "Is the server the terminal is communicating with, as well as the contents of the communication, correct?" or the like to prompt the user to check and give approval.

The server 180 receives the transmission data transmitted from the network home appliance 140 as well as from the terminal device 100 through the communication unit 181 and uses the determination unit 182 to make a determination as to whether the transmission data from the network home appliance 140 matches the transmission data from the terminal device 100 (S308). The following may be possible: with a method of measuring reception time at the server 180, a method of providing and monitoring time stamps of transmission time at the network home appliance 140 and the terminal device 100, or other methods, if the gap between the reception or transmission time of the data from the network home appliance 140 and the reception or transmission time of the data from the terminal device 100 is greater than or equal to a predetermined period of time, it is determined that the data received from the network home appliance 140 and the data received from the terminal device 100 are invalid even when the values of the received data from the network home appliance 140 match the values of the received data from the terminal device 100.

When the determination unit 182 determines that the data received from the network home appliance 140 matches the data received from the terminal device 100 (S308, YES), the server 180 transmits to the terminal device 100 the matching result of the determination (S309). Meanwhile, when the data determination unit 182 determines that the data received from the network home appliance 140 does not match the data received from the terminal device 100 (S308, NO), the server 180 transmits to the terminal device 100 the mismatching result of the determination (S310).

According to the present embodiment, the terminal device 100 acquires the home-appliance ID, destination server address and internal data of the network home appliance 140 and temporarily performs the same transmission operation as the network home appliance 140 does. Moreover, it is possible to visually check whether the network home appliance 140 is carrying out an appropriate information transmission operation.

First Modified Example

Figure 3:
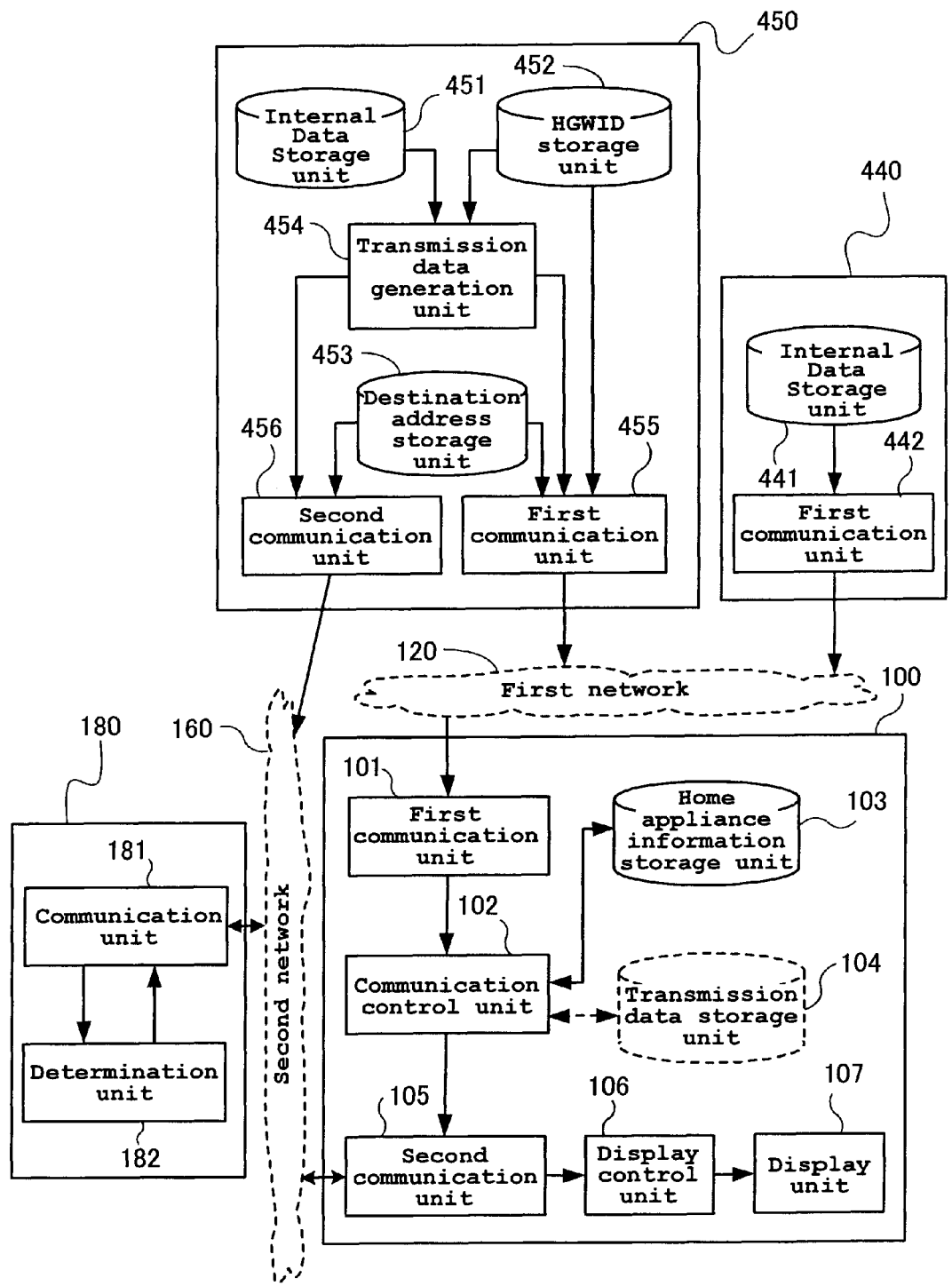
FIG. 3 is a block diagram showing the configuration of a network system according to a first modified example of the present embodiment.

The following describes a network system according to a first modified example of the present embodiment. FIG. 3 is a block diagram showing the configuration of a network system according to a first modified example of the present embodiment. In the embodiment shown in FIG. 1, the network home appliance 140 directly communicates with the server 180. However, as shown in FIG. 3, a home gateway 450 that includes a first communication unit 455 may communicate with the server 180.

As shown in FIG. 3, a network home appliance 440 includes an internal data storage unit 441, which stores internal data, and a first communication unit 442, which transmits the internal data to the home gateway 450 through the first network 120.

The home gateway 450 includes an internal data storage unit 451, a HGWID storage unit 452, a destination address storage unit 453, a transmission data generation unit 454, the first communication unit 455, and a second communication unit 456. HGWID is an identifier for identifying a home gateway.

The home gateway 450 uses the first communication unit 455 to communicate with the network home appliance 440 through the first network 120, acquires the internal data of the network home appliance 440, and stores the internal data in the internal data storage unit 451.

The HGWID storage unit 450 stores a HGWID; the internal data storage unit 451 stores the internal data of the network home appliance 440.

The transmission data generation unit 454 of the home gateway 450 generates the transmission data containing the internal data and the HGWID; the second communication unit 456 transmits the transmission data to the server 180. Incidentally, the server 180 to which the transmission data is transmitted is specified by the destination address stored in the destination address storage unit 453.

The terminal device 100 uses the first communication unit 101 to acquire the HGWID and the destination address as well as the transmission data containing the HGWID and the internal data from the home gateway 450. In this manner, the terminal device 100 temporarily performs the same operation as the home gateway 450 does. That is, the terminal device 100 transmits to the server 180 the transmission data containing the HGWID and the internal data of the home appliance 440. Incidentally, the terminal device 100 may use the first communication unit to acquire the internal data directly from the home appliance 440.

After the server 180 receives the transmission data from the home gateway 450 and the terminal device 100, the determination unit 182 makes a determination as to whether the transmission data received from the home gateway 450 matches the transmission data received from the terminal device 100. When it is determined that the transmission data from the home gateway 450 matches the transmission data from the terminal device 100, the server 180 transmits to the terminal device 100 the matching result of the determination. When it is determined that the transmission data from the home gateway 450 does not match the transmission data from the terminal device 100, the server 180 transmits to the terminal device 100 the mismatching result of the determination.

After receiving the result of the determination from the server 180, the terminal device 100 displays the result of the determination on the display unit 107.

According to the present embodiment, the terminal device 100 acquires the HGWID, destination server address and internal data of the home gateway 450 and temporarily performs the same transmission operation as the home gateway 450 does. Moreover, it is possible to visually check whether the home gateway 450 is carrying out an appropriate information transmission operation.

Second Modified Example

Figure 4:
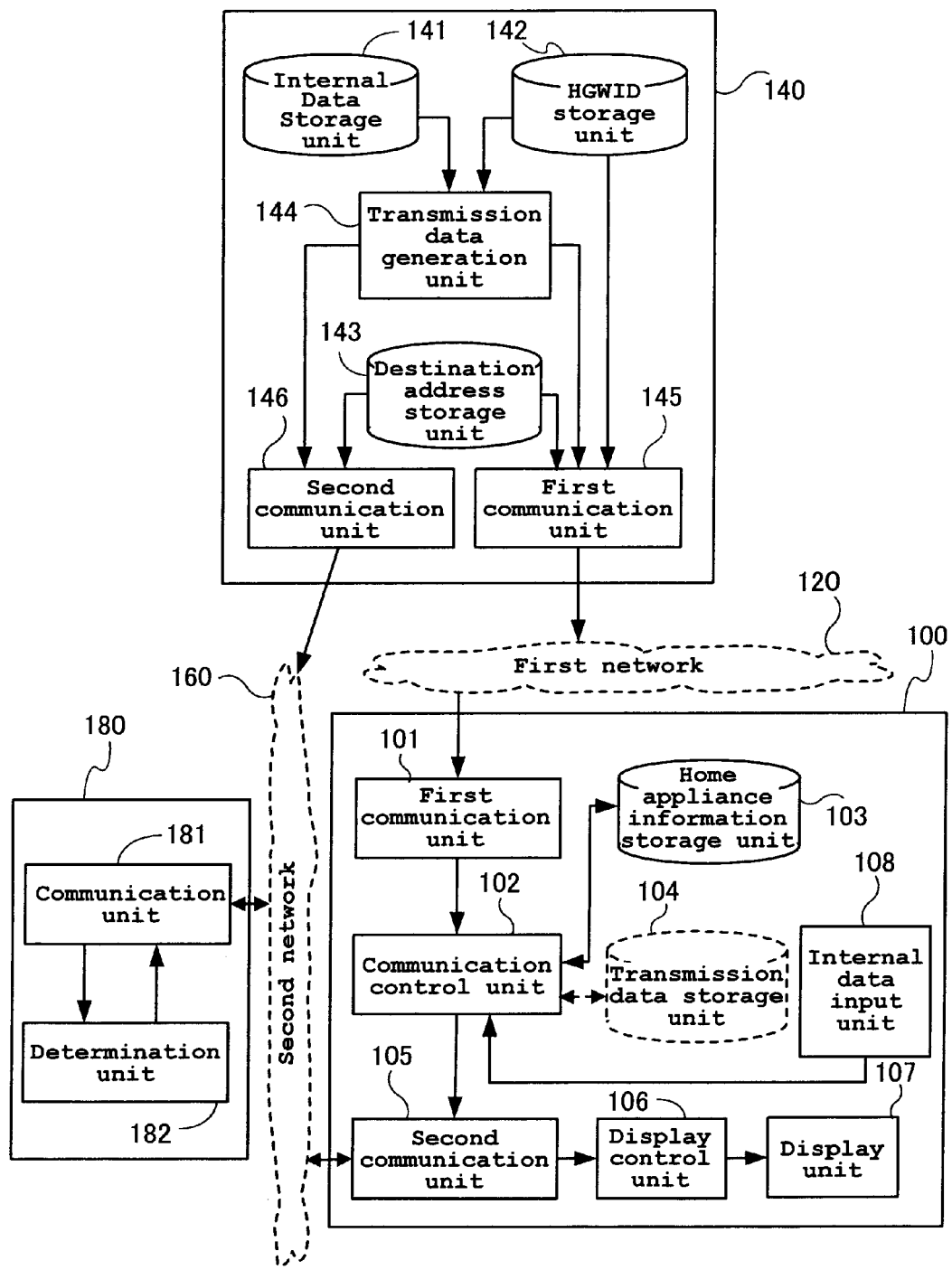
FIG. 4 is a block diagram showing the configuration of a network system according to a second modified example of the present embodiment.

The following describes a system according to a second modified example of the present embodiment. FIG. 4 is a block diagram showing the configuration of a system according to a second modified example of the present embodiment. As shown in FIG. 4, in the second modified example of the present embodiment, the terminal device 100 is equipped with an internal data input unit 108, through which a user inputs arbitrary internal data (which is, for example, setting information needed for the network home appliance 140 to get a service from the server 180). The internal data is transmitted through the first network 120 to the first communication unit 145 that the network home appliance 140 has. Thus, the same internal data is kept by the terminal device 100 and the network home appliance 140.

In this case, except for the fact that the internal data is input into the terminal device 100, the function and operation of the system is the same as the function and operation described in the embodiment and therefore will not be described here.

Incidentally, the terminal device 100 may be realized by using a general-purpose computer device as basic hardware. That is, the following can be realized by a processor that is mounted on the above computer device to execute a program: the first communication unit 101, the communication control unit 102, the home appliance information storage unit 103, the second communication unit 105, the display control unit 106, and the display unit 107. In this case, the terminal device 100 may be realized by installing the above program in advance on the computer device, or by installing the program on the computer device appropriately with the above program being distributed through a storage medium, such as CD-ROM, in which the program is stored, or through a network. The home appliance information storage unit 103 and the transmission data storage unit 104 may be realized by appropriately using a storage medium, such as a memory, hard disk, CD-R, CD-RW, DVD-RAM or DVD-R, which is a built-in or external storage medium of the above computer device, or the like.

While certain embodiments have been described, these embodiments have been presented by way of example only, and are not intended to limit the scope of the inventions. Indeed, the novel methods and systems described herein may be embodied in a variety of the other forms; furthermore, various omissions, substitutions and changes in the form of the methods and systems described herein may be made without departing from the sprit of the inventions. The accompanying claims and their equivalents are intended to cover such forms or modifications as would fall within the scope and spirit of the inventions.

What is claimed is:

1. A terminal device comprising:
   a first communication circuit communicating with a network device connected to a network, the first communication circuit:
      receiving a first destination address of a first server accompanied with identification information for identifying the network device, the first destination address being unknown to the terminal device, and
      receiving from the network device first transmission data which is the same data as second transmission data that the network device transmits to the first server, the first transmission data containing internal data of the network device and the identification information;
   a device information storage that stores the first destination address in association with the identification information;
   a second communication circuit communicating with a second server which has a second destination address, the second communication circuit:
      transmitting the first transmission data using the first destination address that corresponds to the identification information in the device information storage, and
      receiving from the second server a result indicating whether the first transmission data transmitted from the second communication circuit matches the second transmission data that the network device transmits to the first server, whether the first transmission data is received by the second server, and whether the first destination address matches the second destination address; and a display that displays the result.

2. The terminal device according to claim 1, wherein the internal data is user's operation history information of the network device, operating history information, failure occurrence information, setting information that the network device uses to connect to a network, or setting information that the network device uses to get a service from the first server.

3. The terminal device according to claim 2, wherein the display displays the first transmission data that the second communication circuit transmits and the first destination address.

4. The terminal device according to claim 3, wherein a result of examining the first destination address with the use of an authentication function of a Web browser is displayed on the display.

5. A terminal device comprising:

a first communication circuit communicating with a home gateway connected to a network, the first communication circuit:

receiving a first destination address of a server accompanied with home gateway identification information for identifying the home gateway, the first destination address being unknown to the terminal device, and receiving from the home gateway first transmission data which is the same data as second transmission data which the home gateway transmits to the first server, the first transmission data containing internal data of the home gateway and the home gateway identification information;

a device information storage that stores the first destination address in association with the home gateway identification information;

a second communication circuit communicating with a second server which has a second destination address, the second communication circuit:

transmitting the first transmission data to the first destination address that-corresponds to the home gateway identification information in the device information storage, and receiving from the second server a result indicating whether the first transmission data transmitted from the second communication circuit matches the second transmission data that the home gateway transmits to the first server, whether the first transmission data is received by the second server, and whether the first destination address matches the second destination address; and a display that displays the result.

6. The terminal device according to claim 4, further comprising an input unit through which the internal data is input, wherein the internal data is transmitted to the network device through the network.

7. A non-transitory computer-readable medium storing a program, that when executed, causes a terminal device to perform a method, the method comprising:

communicating with a network device connected to a network by receiving a first destination address of a first server accompanied with identification information for identifying the network device, the first destination address being unknown to the terminal device, and receiving from the network device first transmission data which is the same data as second transmission data that the network device transmits to the first server, the first transmission data containing internal data of the network device and the identification information;

storing the first destination address in association with the identification information;

communicating with a second server which has a second destination address, by transmitting the first transmission data using the first destination address that corresponds to the identification information in a device information storage, and by receiving from the second server a result indicating whether the transmitted first transmission data matches the second transmission data that the network device transmits to the first server, whether the first transmission data is received by the second server, and whether the first destination address matches the second destination address; and displaying the result.

* * * * *